Nov. 29, 1955
W. T. HARRIS
2,725,548
VARIABLE-CAPACITOR TRANSDUCER
Filed July 24, 1951
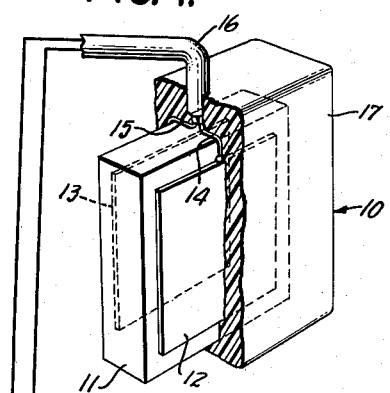
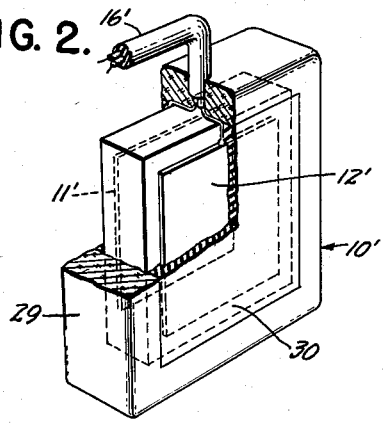
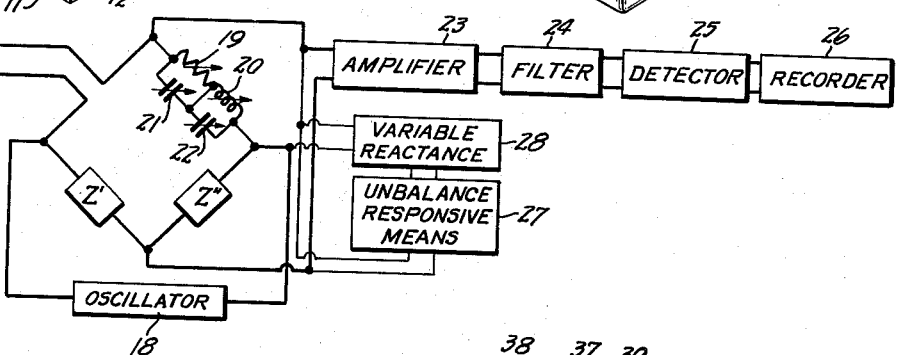
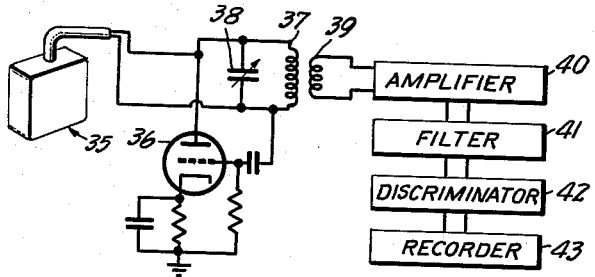
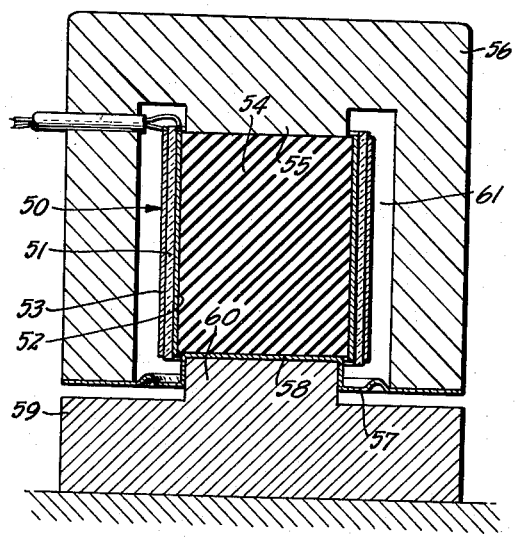
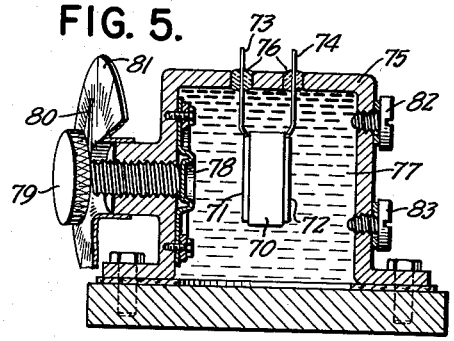
INVENTOR
WILBUR T. HARRIS
BY
Mitchell & Bechert
ATTORNEYS United States Patent Office 2,725,548
Patented Nov. 29, 1955

2,725,548

VARIABLE-CAPACITOR TRANSDUCER

Wilbur T. Harris, Southbury, Conn., assignor to The Harris Transducer Corporation, Southbury, Conn., a corporation of Connecticut Application July 24, 1951, Serial No. 238,329

5 Claims. (Cl. 340—17)

My invention relates to improved transducer means, and in particular to such transducer means and associated electric circuitry for the detection of relatively low-frequency pressure variations.

The use of capacitance microphones is well known, and capacitance hydrophones have been used to a limited extent. Their usefulness has been due to their relatively uniform frequency characteristic, but they have the disadvantage of being relatively high-impedance devices (very inefficient in terms of $V^2/Z$, where V is the A.-C. output voltage and Z is the electrical impedance) except at high frequencies. Thus, use of their uniform characteristic, even for high sound intensities, requires the incorporation of preamplifiers, so that stray capacitance effects may be minimized by employment of short leads.

In construction, the capacitance transducers employed have generally taken the form of parallel-capacitor plates, with one plate fixed, and the other subject to movement relative to the fixed plate in response to acoustic pressure. Lacking ruggedness and versatility, this type of capacitor construction thus has its disadvantages in addition to low efficiency.

Accordingly, it is an object of the invention to provide improved transducer means of the character indicated.

It is another object to provide a rugged capacitance transducer of high efficiency and versatility.

It is a further object to provide a capacitance transducer of effectively substantially lower impedance than is characteristic of past capacitance transducers.

It is also an object to provide an improved low-frequency transducer having an extended broad band of substantially uniform low-frequency response.

It is a specific object to provide a transducer of the character indicated with means for automatically maintaining maximum sensitivity of the device.

Other specific objects are to provide transducer means specifically applicable to hydrophone and microphone and geophone uses.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a view schematically showing a circuit including a transducer incorporating features of the invention, the transducer element being shown in perspective, and partly broken-away;

Fig. 2 is a partly broken-away enlarged perspective of a slightly modified transducer, which may utilize the detection circuit of Fig. 1;

Fig. 3 is a simplified circuit diagram illustrating a modification of the arrangement of Fig. 1;

Fig. 4 is a vertical sectional view of a geophone incorporating features of the invention; and Fig. 5 is a view generally in longitudinal section of a variable capacitance circuit element incorporating features of the invention.

Briefly stated, my invention contemplates detection of pressure variations, including low-frequency variations, with uniformly high sensitivity throughout a broad band of response. Such detection may be achieved by treating the transducer as a capacitative variable reactance and by utilizing low-frequency reactance fluctuations to modulate a high-frequency carrier. The low-frequency signal may be resolved by means of a detector and by such filtering means and amplifier means as are necessary. In one general form to be described, the reactance in the transducer produces amplitude modulations on the carrier, and in another form frequency modulations are produced; in each case, the detector means may readily develop the low-frequency signal.

Transducers according to the present invention are to be clearly distinguished from the various past forms of capacitative transducers. According to the invention, the capacitative element of the transducer includes a dielectric having a dielectric constant that is pressure-responsive. Thus, transducer response is observable as a capacitance change reflecting a change in the dielectric constant. In the event that a piezo-electro material is employed as the dielectric, I provide means for arbitrarily rejecting piezo-electric charges developed in response to pressure. My invention therefore need not use piezo-electric materials, but, if used, such materials need only be employed for their pressure-responsive dielectric constant; in fact, according to my invention, when piezo-electric materials are used, they need not be polarized, as is necessary when developing the well-known piezo-electric response. My invention may utilize as dielectric materials those having electrically symmetrical characteristics or those having electrically asymmetrical characteristics.

Referring to Fig. 1 of the drawings, my invention is shown in application to a capacitative transducer 10, including a dielectric 11 having a pressure-responsive dielectric constant, for the detection of low-frequency energy. The transducer may be simple and rugged and merely comprise spaced electrodes or plates 12—13 cemented or otherwise applied with preferaby uniform spacing to opposite sides of the dielectric 11. Leads 14—15 may be attached to the respective electrodes 12—13 and brought out in a common lead cable 16 disposed generally centrally of one end or edge of the transducer 10. For protection of the dielectric 11 and of the electrodes 12—13, the entire transducer may be encased in a coating or cast into a block 17 of plastic or the like material that is effectively transparent to the type of pressure fluctuations to be observed.

In accordance with a feature of the invention, I energize the described transducer 10 with a high-frequency signal which may be derived from an oscillator 18. This high frequency is to carry low-frequency modulations and is therefore in excess of the maximum frequency to be expected in the low-frequency response band of the transducer. For example, if the response band is to extend from 0 to 10 kilocycles per second, then the frequency of oscillator 18 may be 20 kc./s.

In the form shown in Fig. 1, oscillator 18 is connected to the transducer through an A.-C. bridge circuit having four interconnected arms. Fixed impedances Z'—Z" may characterize two of the conjugate arms; the transducer 10 may be included in the third arm, and variable ballast-impedance means may comprise the fourth arm. A variable resistance 19, a variable inductance 20, and variable capacitances 21—22 bridging resistor 19 and inductance 20 may provide for adjustment of the bridge for complete balance, taking into account the effective impedance of the transducer, as seen through its leads.

Bridge output may be taken from the unfed corners of the bridge; I have schematically shown amplifier means 23 to amplify the output signal, filter means 24 to exclude all signals except the carrier and its modulation products (i. e. sidebands), detector means 25 to detect the envelope of the modulated carrier frequency, and recorder means 26 to display the detected envelope. It will be understood that the described elements 23 to 26 are merely illustrative and that various forms of detector means and display means may be provided as dictated by particular requirements.

When the bridge has been balanced by appropriate adjustment of impedances 19 to 22, the described device will have maximum sensitivity to transient changes in the capacitance of the transducer. Such changes develop whenever incident pressure variations change the state of strain in the dielectric material of the transducer. Strain changes are accompanied by changes in the dielectric constant of the material 11 so as to alter the capacitance of the transducer.

In certain instances, as where changing ambient conditions cause corresponding unbalances in the bridge, sensitivity may be maintained automatically at substantially the optimum value. In the arrangement shown, unbalance-responsive means 27, having preferably a longer time constant than the amplifier-detector means 23—25, is connected across the bridge output in order to generate signals for the control of variable-reactance means 28. Variable-reactance means 28 may be connected across the ballast arm 19—20—21—22 so as to institute appropriate balancing correction, as will be understood.

As indicated generally above, my transducer 10 may operate satisfactorily with any dielectric material 11 provided that the dielectric constant thereof is pressure-responsive. I have found electrically symmetrical and electrically asymmetrical crystalline materials to be satisfactory; with all these materials the dielectric constant will vary with hydrostatic pressure, but in the case of the electrically asymmetrical crystalline materials the property of having the dielectric constant vary under directional stress may be utilized to advantage. Such materials as tourmaline and lithium sulphate and salts of univalent metals, such as sodium chloride, potassium chloride, and potassium bromide, belong to the first class, namely, to the family of substances which is merely responsive to hydrostatic pressure. Polycrystalline materials including titanium ceramics or mixed compositions thereof, as well as piezo-electric crystals and ceramics, belong to the second class. It will be noted that, in the employment of a piezo-electric dielectric, operation in accordance with the invention may proceed at temperatures well above the Curie point; for example, strontium titanate has a Curie temperature of approximately —190° C. and may exhibit desirable and nearly constant electrical properties in the range of ordinary temperatures.

The asymmetrical crystalline materials are found to exhibit characteristically different directional responses to pressure, as far as the dielectric constant is concerned. In illustration of a mode for the selective employment of a particular directional response in such a material, I show in Fig. 2 a transducer 10' generally resembling that of Fig. 1 but characterized by application of a peripheral layer 29 of pressure-relieving material, such as cork, so as to attenuate responses on axes other than the desired response axis. A layer of acoustically transparent material 30 may be applied over the active faces of the transducer 10', and, if desired, the entire assembly may be dipped in a protective coating of plastic (not shown in Fig. 2, in a manner generally illustrated in Fig. 1).

Fig. 3 illustrates an alternative method of modulating a high-frequency carrier in accordance with the variable a capacitance characteristic of a transducer 35, which may be of the nature described at 10—10' in Figs. 1 and 2. In Fig. 3, however, the modulation is a frequency modulation on the carrier frequency. In the present simplified showing, the oscillator comprises a tube 36 and a tank circuit including inductance 37 and capacitance 38. The transducer 35 may be connected across the tank circuit 37—38. The frequency-modulated carrier may be picked off inductively at 39 and appropriately treated by amplifier means 40 and filter means 41 prior to detection in a discriminator 42, the output of which may feed a conventional recorder or display means, designated 43.

As indicated generally above, my invention may be useful in geophyscial prospecting applications, as illustrated in Fig. 4. The geophone of Fig. 4 is built around a cylindrical capacitive unit 50 including a ceramic, salt, or otherwise suitably pressure-responsive dielectric material 51. The electrodes of the transducer 50 may include an inner cylindrical plate or foil 52 and an outer cylindrical plate or foil 53, cemented or otherwise intimately applied to the dielectric material of core 51. The interior of the cylindrical transducer 50 may be filled with an elastic medium 54 for transforming axially directed pressure variations into radial deformations and, therefore, into tangential strains in the dielectric material 51. One end of the cylindrical unit may be effectively closed off by an axially projecting part 55 of a counterweight member 56. The counterweight 56 may be cylindrical and have a hollow interior to receive the transducer 50, as shown. The other end of this interior may be closed off by means of a diaphragm 57. In the form shown, the diaphragm 57 includes a central portion 58 longitudinally movable with respect to the cylindrical member 50 and in intimate relation with the elastic medium 54. Piston 59 may include a stem portion 60 conforming to the central part 58 of the diaphragm 57. As suggested by the drawing, both the piston 59 and the counterweight 56 are preferably characterized by relatively high mass.

In use, the piston 59 will be placed upon the ground or otherwise oriented as desired, and earth-transmitted shocks will appear as longitudinal thrusts of the piston 59 working against the inertia of the counterweight 56. This action will cause radial deformation of the elastic material 54 and of the cylindrical core 51 against the annular air-filled pocket 61 within counterweight 56. The signal-process means described in connection with the embodiments of Figs. 1 and 3 may be applied in the arrangement of Fig. 4, so that the geophone may exhibit a broad-band low-frequency response of uniform or substantially uniform sensitivity.

In Fig. 5, I show an application of the principles of the invention to the provision of a variable capacitance as a circuit element. As before, the transducer may comprise a dielectric 70 having a pressure-responsive dielectric constant and sandwiched between opposed electrodes 71—72. The transducer may be suspended by means of rigid leads 73—74 within an envelope or housing 75. Glass-bead means 76 may provide adequate support of the leads 73—74 and a pressure-tight seal of the vessel 75. The vessel 75 may be filled with a suitable incompressible fluid 77 against which the transducer is protected (by means not shown) or in which neither the cement nor the dielectric of the transducer is soluble.

In accordance with the invention, I provide means whereby the fluid 77 and therefore the transducer may be adjustably selectively subjected to various pressures. Such means may include a diaphragm member 78 and a manually operated screw 79 for adjustably projecting the diaphragm 78 against the fluid 77. If desired, the screw 79 may be provided with an indicator needle 80 against a calibrated dial 81, so that a given pressure loading of the transducer may be readily accomplished. I have shown sealing screws 82—83 at openings which may be utilized for filling the housing 75 with fluid 77. If desired, for relatively precise control of capacitance, electrically operated heating means may be threadedly inserted into the vessel 75 in place of the screw 83, and temperature-responsive probe means may be similarly inserted in place of the screw 82. With the feedback control provided by the probe at 82, a desired relatively constant temperature may be held within the chamber by well-known means.

It will be appreciated that I have described improved transducer and circuit means whereby low-frequency response of substantially uniform sensiitvity may be obtained over a relatively broad band. With my arrangements, a sufficiently powerful oscillator may assure signal levels large enough for convenient use without excessive amplification. The transducer itself is simple, rugged, and flexible for many applications, and sensitivities many times in excess of those previously obtainable are readily achieved with the present method of observing changes in the dielectric constant. Should piezo-electric materials be used as dielectrics, my circuits may automatically reject the piezo-electric charge; this charge and variations thereof are incapable of modulating the carrier frequency in either of the described modulation systems, and charge variations are therefore rejected and cannot be reflected in the filtered sideband envelope that is fed to the display means. I have specifically described certain forms of the invention for use in certain sound-transmitting media, but it will be understood that these forms have utility in other media; for example, the geophone of Fig. 4 may be useful in underwater applications.

While I have described my invention in detail for the preferred forms shown, it will be understood that modifications may be made within the scope of the invention as defined in the appended claims.

I claim:

1. A geophone, comprising an annular capacitative transducer with inner and outer electrodes and electrically responsive to radially directed pressure fluctuations, a piston including a stem substantially closing off one end of said transducer and longitudinally movable relatively to said transducer, a yieldable substantially incompressible material filling the interior of said transducer, diaphragm means carried by said piston and in pressure-transmitting relation with said material and including a circumferentially extending portion extending radially outside said transducer, and a counterweight having a closed end and an open end so as to define an annularly extending skirt radially spaced from said transducer, said skirt being connected to the periphery of said diaphragm, and said closed end including a part in intimate pressure-transmitting relation with said yieldable material.

2. A geophone, including a hollow crystalline elongated capacitative transducer filled with pressure-transmitting rubber-like material, piston means in pressure-transmitting relation with one end of said material and substantially closing off said end of said transducer, and a massive counterweight including a portion in pressure-transmitting relation with said material at the other end thereof and substantially closing off the other end of said transducer, whereby pressure fluctuations directed longitudinally of said transducer may be translated into radial deformations of said transducer and therefore into corresponding changes in the dielectric constant of the crystalline material of said transducer, said counterweight including an elongated skirt spaced from and surrounding a substantial part of said transducer.

3. A geophone, comprising an elongated hollow cylindrical transducer electrically responsive to radially directed pressure fluctuations, pressure-transmitting means substantially filling said transducer and in intimate pressure-transmitting relation with the radially inner limits thereof, piston means in clearance relation with and substantially closing one end of said transducer and in pressure-transmitting relation with said pressure-transmitting means, and counterweight means in clearance relation with and substantially closing the other end of said transducer and in pressure-transmitting relation with said pressure-transmitting means, said counterweight means including an elongated cylindrical skirt radially spaced from said transducer and extending into proximity with but clear of said piston means.

4. A geophone according to claim 3, and axially yieldable diaphragm means connecting said skirt to said piston means and continuously sealing the otherwise open axial end of the space defined by the radial clearance between said skirt and said transducer.

5. A geophone according to claim 3, in which said transducer is a cylinder of a barium titanate with inner and outer electrodes on the inner and outer surfaces thereof.

References Cited in the file of this patent
UNITED STATES PATENTS

| | | |
|---|---|---|
| 2,064,489 | Neuman | Dec. 15, 1936 |
| 2,411,117 | Scherbatskoy | Nov. 12, 1946 |
| 2,413,116 | Shook et al. | Dec. 24, 1946 |
| 2,473,556 | Wiley | June 21, 1949 |
| 2,548,947 | Clewell | Apr. 17, 1951 |
| 2,614,416 | Hollmann | Oct. 21, 1952 |
| 2,648,823 | Kock et al. | Aug. 11, 1953 |